US012793517B2

(12) United States Patent
Xu et al.

(10) Patent No.: US 12,793,517 B2
(45) Date of Patent: *Nov. 10, 2026

(54) CHECKOUT DEVICES, CHECKOUT ASSEMBLIES, AND CHECKOUT METHODS

(71) Applicant: Shanghai Ant Chuangjiang Information Technology Co., Ltd., Shanghai (CN)

(72) Inventors: Youchao Xu, Hangzhou (CN); Zhiyuan Chen, Hangzhou (CN)

(73) Assignee: Shanghai Ant Chuangjiang Information Technology Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/287,444

(22) Filed: Jul. 31, 2025

(65) Prior Publication Data

US 2025/0356738 A1 Nov. 20, 2025

Related U.S. Application Data

(63) Continuation of application No. 18/931,915, filed on Oct. 30, 2024, now Pat. No. 12,400,527, which is a continuation of application No. PCT/CN2024/118727, filed on Sep. 13, 2024.

(30) Foreign Application Priority Data

Feb. 6, 2024 (CN) ......................... 202410172314.3

(51) Int. Cl.
*G07G 1/00* (2006.01)
*G07G 1/06* (2006.01)

(52) U.S. Cl.
CPC ......... *G07G 1/0045* (2013.01); *G07G 1/0018* (2013.01); *G07G 1/06* (2013.01)

(58) Field of Classification Search
CPC ...... G07G 1/00; G07G 1/0009; G07G 1/0018; G07G 1/0036; G07G 1/06; G06Q 20/3278
USPC ............................ 235/380, 383, 451, 472.01
See application file for complete search history.

(56) References Cited

U.S. PATENT DOCUMENTS

| | | | | |
|---|---|---|---|---|
| 12,333,522 | B1 * | 6/2025 | Xu | H04B 5/70 |
| 12,400,527 | B2 * | 8/2025 | Xu | G06Q 20/204 |
| 2012/0168503 | A1 | 7/2012 | Pilllips | |
| 2014/0263608 | A1 | 9/2014 | Rivera et al. | |

(Continued)

FOREIGN PATENT DOCUMENTS

| | | |
|---|---|---|
| CN | 104794611 A | 7/2015 |
| CN | 205354211 U | 6/2016 |

(Continued)

OTHER PUBLICATIONS

Extended European Search Report in European Appln. No. 24794689.0, mailed on Jun. 30, 2025, 11 pages.

(Continued)

*Primary Examiner* — Suezu Ellis
(74) *Attorney, Agent, or Firm* — Fish & Richardson P.C.

(57) ABSTRACT

An example checkout device includes a housing that encloses a cavity space, a display screen fastened to the housing, and a Near Field Communication (NFC) module located in the cavity space that is enclosed by the housing. The cavity space is at least partially covered by a top cover that protrudes from an upper surface of the housing.

18 Claims, 5 Drawing Sheets

(56) References Cited

U.S. PATENT DOCUMENTS

| | | | |
|---|---|---|---|
| 2016/0117662 A1 | 4/2016 | Bedier et al. | |
| 2016/0125388 A1 | 5/2016 | Gao et al. | |
| 2017/0139444 A1 | 5/2017 | Singgih et al. | |
| 2018/0121900 A1 | 5/2018 | Spice | |
| 2019/0012655 A1 | 1/2019 | Dong et al. | |
| 2019/0251802 A1 | 8/2019 | Luo et al. | |
| 2021/0097522 A1 | 4/2021 | Martin et al. | |
| 2021/0182442 A1 | 6/2021 | Slaney et al. | |
| 2021/0182820 A1 | 6/2021 | Nieuwborg et al. | |
| 2021/0295634 A1 | 9/2021 | Mansutti | |
| 2021/0374707 A1 | 12/2021 | Sartori et al. | |
| 2023/0121126 A1 | 4/2023 | Andler et al. | |
| 2025/0356338 A1* | 11/2025 | Xu | G06Q 20/208 |

FOREIGN PATENT DOCUMENTS

| | | | |
|---|---|---|---|
| CN | 106710092 | A | 5/2017 |
| CN | 206497493 | U | 9/2017 |
| CN | 206541393 | U | 10/2017 |
| CN | 207037731 | U | 2/2018 |
| CN | 207909261 | U | 9/2018 |
| CN | 208422016 | U | 1/2019 |
| CN | 109615802 | A | 4/2019 |
| CN | 209928323 | U | 1/2020 |
| CN | 110796806 | A | 2/2020 |
| CN | 210166881 | U | 3/2020 |
| CN | 111192420 | A | 5/2020 |
| CN | 211577992 | U | 9/2020 |
| CN | 111784942 | A | 10/2020 |
| CN | 112200984 | A | 1/2021 |
| CN | 114881631 | A | 8/2022 |
| CN | 217880458 | U | 11/2022 |
| CN | 218332769 | U | 1/2023 |
| CN | 219872517 | U | 10/2023 |
| CN | 219916420 | U | 10/2023 |
| CN | 219978916 | U | 11/2023 |
| EP | 3543894 | A1 | 9/2019 |
| JP | 2005-084794 | A | 3/2005 |
| JP | 2007-272299 | A | 10/2007 |
| JP | 2012-185543 | A | 9/2012 |
| JP | 2020-523704 | A | 8/2020 |

OTHER PUBLICATIONS

International Search Report and Written Opinion in International Appin. No. PCT/CN2024/118727, mailed on Dec. 20, 2024, 12 pages (with partial English translation).

Machine translation of CN 208422016 retrieved Apr. 15, 2025 (Year: 2025).

Machine translation of CN 217880458, retrieved from European Patent Office on Dec. 19, 2024 (Year: 2024).

Machine translation of CN 219872517 retrieved from European Patent Office on Dec. 28, 2024 (Year: 2024).

Machine translation of JP 2012185543, retrieved from European Patent Office on Dec. 28, 2024 (Year: 2024).

* cited by examiner

CHECKOUT DEVICES, CHECKOUT ASSEMBLIES, AND CHECKOUT METHODS

CROSS-REFERENCE TO RELATED APPLICATIONS

This application is a continuation and claims the benefit of priority to U.S. application Ser. No. 18/931,915, filed Oct. 30, 2024, which is a continuation of PCT Application No. PCT/CN2024/118727, filed on Sep. 13, 2024, which claims priority to Chinese Patent Application No. 202410172314.3, filed on Feb. 6, 2024, and each application is hereby incorporated by reference in its entirety.

TECHNICAL FIELD

This application relates to the field of electronic payment technologies, and in particular, to checkout devices, checkout assemblies, and checkout methods.

BACKGROUND

With the rapid development of Internet technologies, electronic transactions have entered people's lives. However, an existing checkout device requires a merchant to hold a code scanner to scan a payment code of a user or requires a user to align a mobile terminal with a code scanning window of the checkout device, to complete a payment. This takes up time of the merchant and reduces checkout efficiency.

SUMMARY

This application provides checkout devices, checkout assemblies, and checkout methods, to improve checkout efficiency.

Some implementations of this application provide a checkout device, including: a housing; a display screen, fastened to the housing, where the display screen is configured to display a to-be-paid amount of a product and/or payment method guidance and/or a payment result; and an NFC module, located in a space enclosed by the housing, to be in close proximity to an electronic device to make an electronic payment.

Further, the checkout device includes a scanning apparatus, and the scanning apparatus is fastened to the housing for scanning the product to obtain a price of the product.

Further, the scanning apparatus and the display screen are located on two opposite sides of the housing.

Further, the checkout device includes an indicator light, the indicator light forms a ring, and light emitted by the indicator light surrounds the NFC module.

Further, the checkout device is in a flat elongated shape, and includes a grip portion, the NFC module and the indicator light are located in a space enclosed by the grip portion, and the display screen is located above the grip portion in a length direction of the checkout device.

Further, the checkout device includes a speaker located in the space enclosed by the housing, and a sound output hole is disposed on the housing for a sound emitted by the speaker to pass through.

Some implementations of this application provide a checkout assembly, including a base and the above-mentioned checkout device. The checkout device is supported on the base.

Further, the base includes a first magnetic component and a first conductive component, the checkout device includes a battery located in the housing, a second magnetic component, and a second conductive component fastened to the housing and exposed, the second conductive component is coupled to the battery, and when the checkout device is placed on the base, the first magnetic component and the second magnetic component attract and secure each other magnetically, and the first conductive component is in electrical contact with the second conductive component to charge the battery.

Further, the base includes a first support portion, a connecting portion, and a second support portion, the first support portion is configured to be supported on a countertop, the connecting portion connects the first support portion and the second support portion, the second support portion is configured to support the checkout device, and the second support portion is disposed inclined relative to a vertical direction.

Further, the second support portion includes a bottom plate portion and a first retaining edge and a pair of second retaining edges extending from the bottom plate portion, and when the checkout device is placed on the base, the first retaining edge abuts against a bottom end of the checkout device, and the pair of second retaining edges are respectively located on two opposite sides of the checkout device.

Some implementations of this application provide an electronic payment method, including: A checkout device and an electronic device are provided, where the checkout device includes a display screen and an NFC module; the checkout device obtains a to-be-paid amount of a product, and displays the to-be-paid amount on the display screen; the checkout device provides payment method guidance; the electronic device approaches the NFC module based on the guidance, to make an electronic payment; and the display screen displays a payment result.

Further, that the checkout device provides payment method guidance includes: The display screen provides visual guidance; and/or a speaker provides voice guidance, where the checkout device includes the speaker; and/or an indicator light provides light guidance, where the checkout device includes the indicator light.

Further, that the display screen provides visual guidance includes: The picture includes a transition image that displays the to-be-paid amount; and that the display screen displays a payment result includes: After the electronic payment is completed, the display screen displays that the transition image moves toward the electronic device and disappears from the display screen.

Further, that the checkout device obtains a to-be-paid amount of a product includes: The to-be-paid amount is manually entered on the display screen; and/or a scanning apparatus scans the product to obtain a price of the product, where the checkout device includes the scanning apparatus.

In the implementations of this application, compared with code scanning payment, disposition of the NFC module in the checkout device makes it more convenient to make a payment, and improves payment efficiency. The display screen is disposed in the checkout device, to display the to-be-paid amount of the product and/or the payment method guidance and/or the payment result. The payment method guidance can direct a consumer to quickly make an electronic payment, so as to improve payment efficiency. The to-be-paid amount of the product and the payment result are displayed. The consumer does not need to consult a merchant about the to-be-paid amount and whether the payment is completed. This frees the merchant, improves payment efficiency, and improves consumer experience.

DESCRIPTION OF EMBODIMENTS

Example implementations are described in detail here, and examples of the example implementations are presented in the accompanying drawings. When the following descriptions relate to the accompanying drawings, unless specified otherwise, the same numbers in different accompanying drawings represent the same or similar elements. The implementations described in the following example implementations do not represent all implementations consistent with this application. On the contrary, the implementations are merely examples of apparatuses and methods consistent with some aspects of this application and described in detail in the appended claims.

User information (including but not limited to user equipment information, personal user information, etc.) and data (including but not limited to data used for analysis, stored data, displayed data, etc.) in this application are information and data that are authorized by a user or that are fully authorized by each party. Furthermore, related data need to be collected, used, and processed in compliance with relevant laws, regulations and standards of relevant countries and regions, and corresponding operation entries are provided for the user to choose to authorize or reject.

Terms used in this application are merely intended to describe specific implementations, but are not intended to limit this application. Terms "a", "the", and "this" in singular forms in this application and the appended claims are also intended to include plural forms, unless otherwise stated in the context clearly. It should be further understood that the term "and/or" used in this specification indicates and includes any or all possible combinations of one or more associated listed items.

It should be understood that although terms "first", "second", "third", etc. may be used in this application to describe various types of information, the information should not be limited to the terms. These terms are merely used to distinguish between information of the same type. For example, without departing from the scope of this application, first information can also be referred to as second information, and similarly, the second information can also be referred to as the first information. Depending on the context, the word "if" used here can be interpreted as "when" or "while" or "in response to determining".

Figure 1:
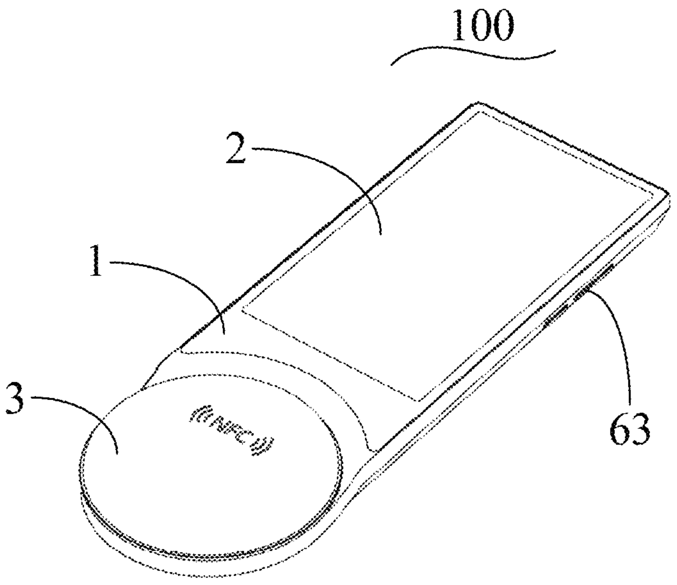
FIG. 1 is a schematic diagram illustrating a checkout device, according to some example implementations of this application.
Figure 2:
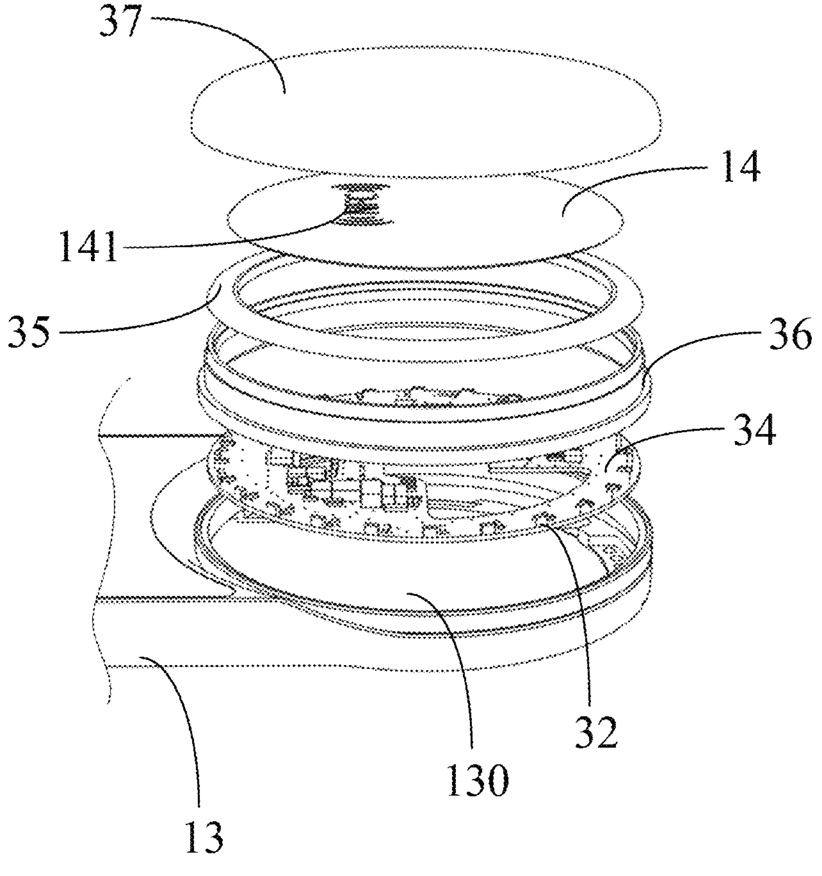
FIG. 2 is an exploded view illustrating the checkout device shown in FIG. 1, where only a part of the checkout device is shown.
Figure 3:
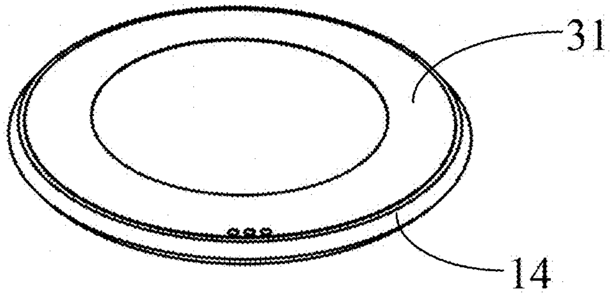
FIG. 3 is a schematic diagram illustrating a top cover shown in FIG. 2.

As shown in FIG. 1 to FIG. 3, a checkout device 100 in some implementations of this application includes a housing 1, a display screen 2, and an NFC module 31. The NFC module 31 is located in a space enclosed by the housing 1, to be in close proximity to an electronic device to make an electronic payment. Compared with code scanning payment, it is more convenient to make a payment, and payment efficiency is improved. The electronic device includes but is not limited to a mobile phone, a tablet, etc.

The display screen 2 is fastened to the housing 1. When the checkout device 100 is used, the display screen 2 faces a consumer, and is configured to display a to-be-paid amount of a product and/or payment method guidance and/or a payment result. The payment method guidance can direct the consumer to quickly make an electronic payment, so as to improve payment efficiency. The to-be-paid amount of the product and the payment result are displayed. The consumer does not need to consult a merchant about the to-be-paid amount and whether the payment is completed. This frees the merchant, improves payment efficiency, and improves consumer experience.

In some implementations, the payment method guidance displayed on the display screen 2 includes an image, text, an animation, etc.

In some implementations, the display screen 2 provides visual guidance, and the picture includes a transition image that displays the to-be-paid amount. After the electronic payment is completed, the display screen displays that the transition image moves toward the electronic device and disappears from the display screen 2, to achieve a similar effect of jumping from the display screen 2 to a payment device by the transition image, so as to improve payment experience.

In some implementations, the transition image can be implemented through animation switching.

In some implementations, the transition image can be spherical, to make the jump more vivid.

In some implementations, the checkout device 100 includes an indicator light 32, the indicator light 32 forms a ring, and light emitted by the indicator light 32 surrounds the NFC module 31, to provide light guidance. This can attract attention of the consumer, to improve payment efficiency.

In some implementations, when the checkout device 100 is in different states, the indicator light 32 can provide different guidance in different light forms. For example, in a normal standby state, the indicator light 32 can flash to attract attention of the consumer. When a payment is guided, the indicator light 32 can direct, by changing a color and by using a marquee, the consumer to make an electronic payment. A payment success and a payment failure can be displayed in different colors, to notify the payment result in a light form. The light form is not limited in this application.

In some implementations, the checkout device 100 is a handheld checkout device, is in an overall flat elongated shape, and includes a grip portion 3, the NFC module 31 and the indicator light 32 are located in a space enclosed by the grip portion 3, and the display screen 2 is located above the grip portion 3 in a length direction of the checkout device 100. The checkout device 100 is lightweight and easy to hold.

In some implementations, the housing 1 includes a main body housing 13 and a circular top cover 14 fastened to the main body housing 13, the NFC module 31 and the indicator light 32 are located below the top cover 14, and the top cover 14 is light-transmissive for light from the indicator light 32 to transmit. The top cover 14 is provided with guiding text 141, to guide a payment method. For example, the guiding text 141 is an NFC identifier, etc.

In some implementations, the guiding text 141 is light-transmissive for the light emitted by the indicator light 32 to transmit. When the indicator light 32 guides a payment, the guiding text 141 is lit.

In some implementations, the checkout device 100 includes a circuit board 34, the indicator light 32 is a plurality of LED beads fastened to the circuit board 34, and the plurality of LED beads are disposed in a circumferential direction of the circuit board 34. In some implementations, the checkout device 100 includes a light guiding ring 35 covering the LED beads.

In some implementations, the NFC module 31 is fastened to the top cover 14.

In some implementations, the main body housing 13 is provided with a cavity 130, the circuit board 34 is located in the cavity 130, the checkout device 100 includes a middle frame 36 and a transparent decorative cover 37, the middle frame 36 is fastened to the main body housing 13, the middle frame 36, the top cover 14, and the decorative cover 37 are fastened together, and the decorative cover 37 covers the top cover 14. The middle frame 36 is disposed so that the top cover 14 protrudes from an upper surface of the main body housing 13, to facilitate a grip.

In some implementations, after the to-be-paid amount is manually entered on the display screen 2, the display screen 2 can display the to-be-paid amount of the product and/or the payment method guidance and/or the payment result.

Figure 4:
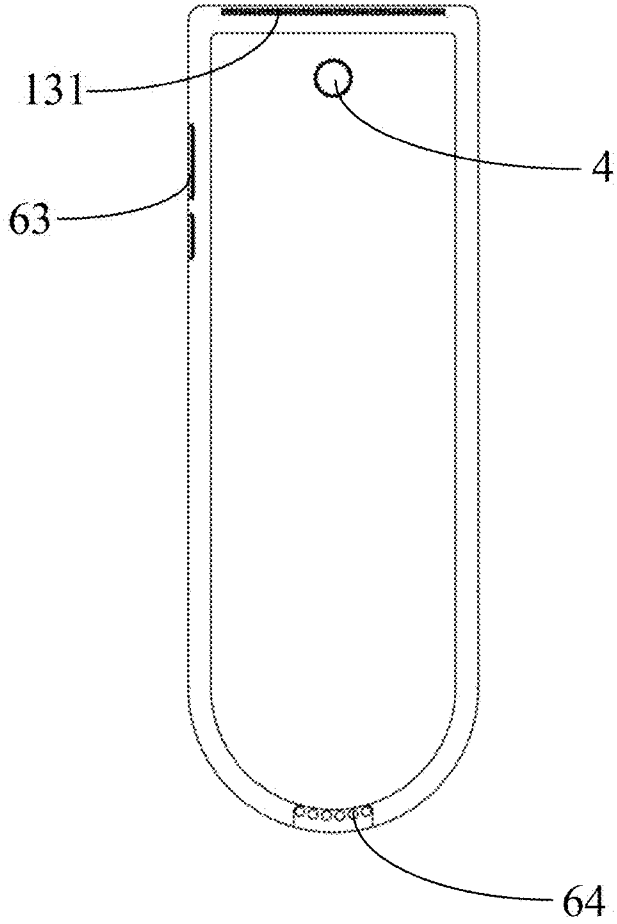
FIG. 4 is a rear view illustrating the checkout device shown in FIG. 1.
Figure 5:
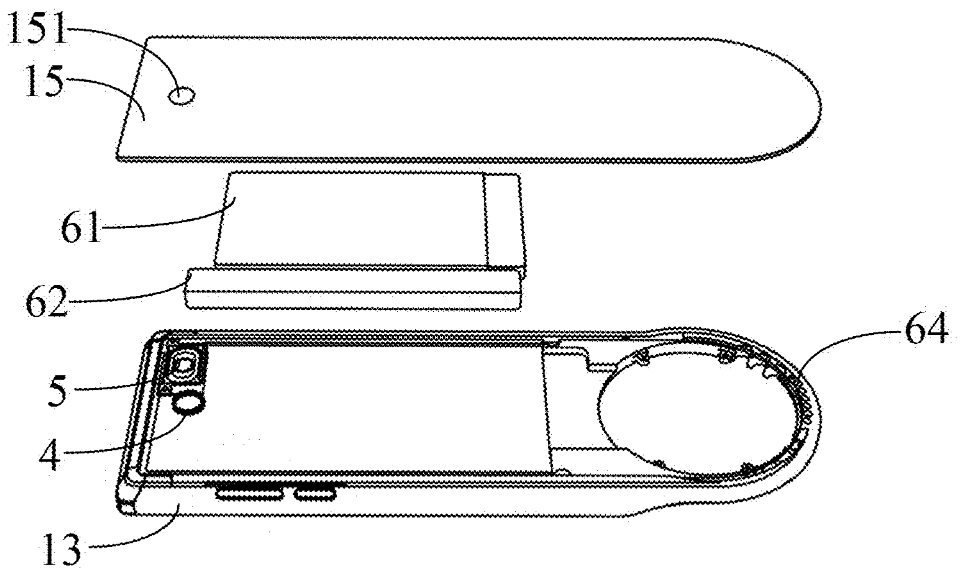
FIG. 5 is an exploded view illustrating the checkout device shown in FIG. 4.
Figure 6:
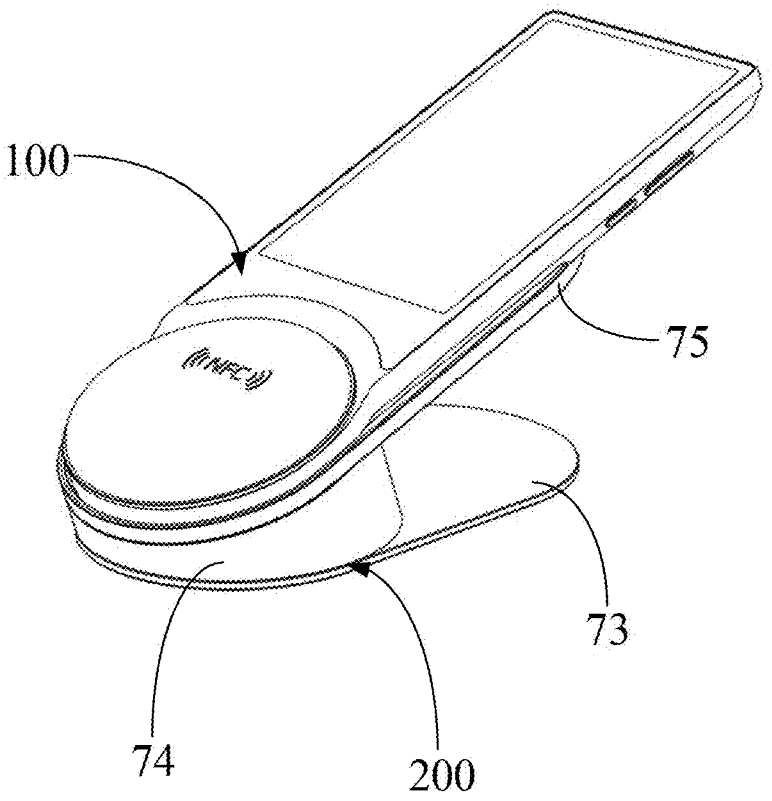
FIG. 6 is a schematic diagram illustrating a checkout assembly, according to some implementations of this application.
Figure 7:
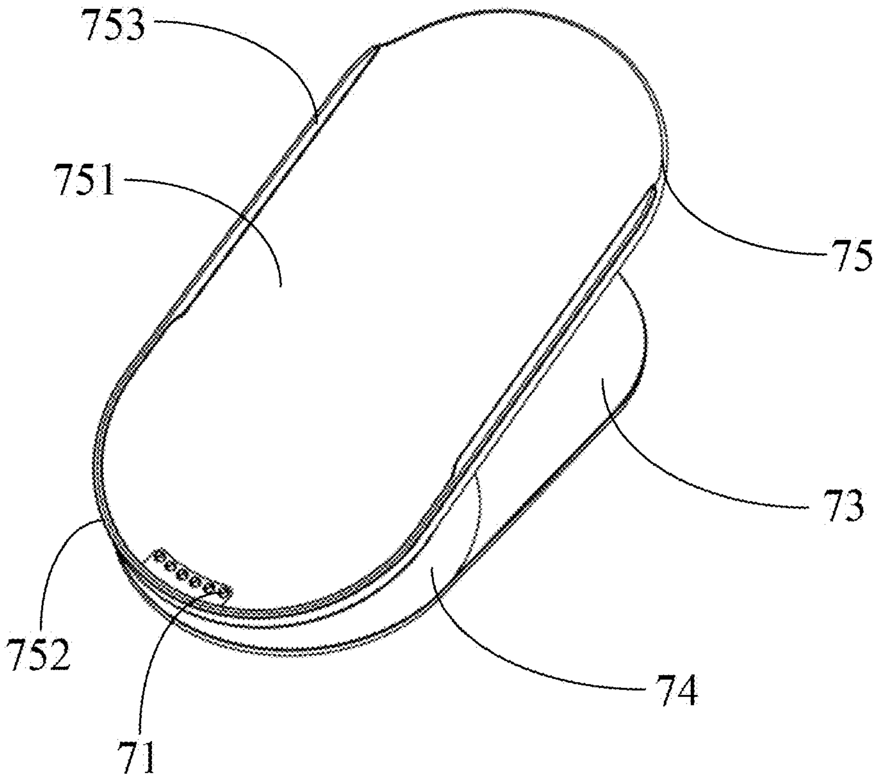
FIG. 7 is a schematic diagram illustrating a base of the checkout assembly shown in FIG. 6.
Figure 8:
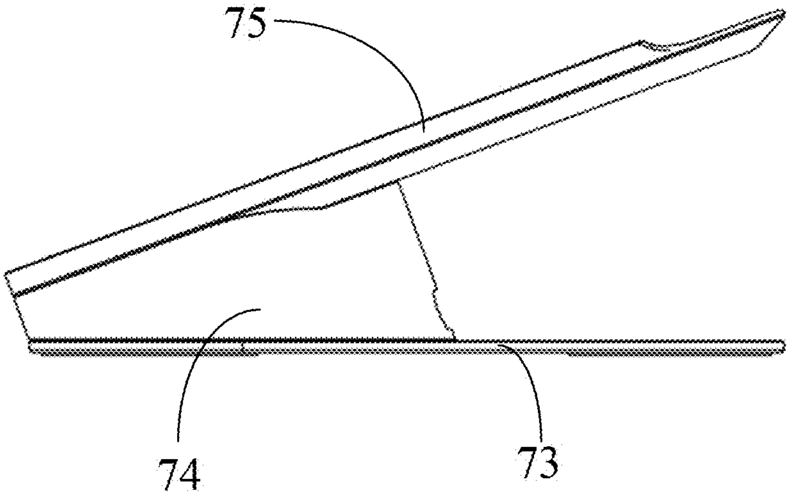
FIG. 8 is a side view illustrating the base shown in FIG. 7.
Figure 9:
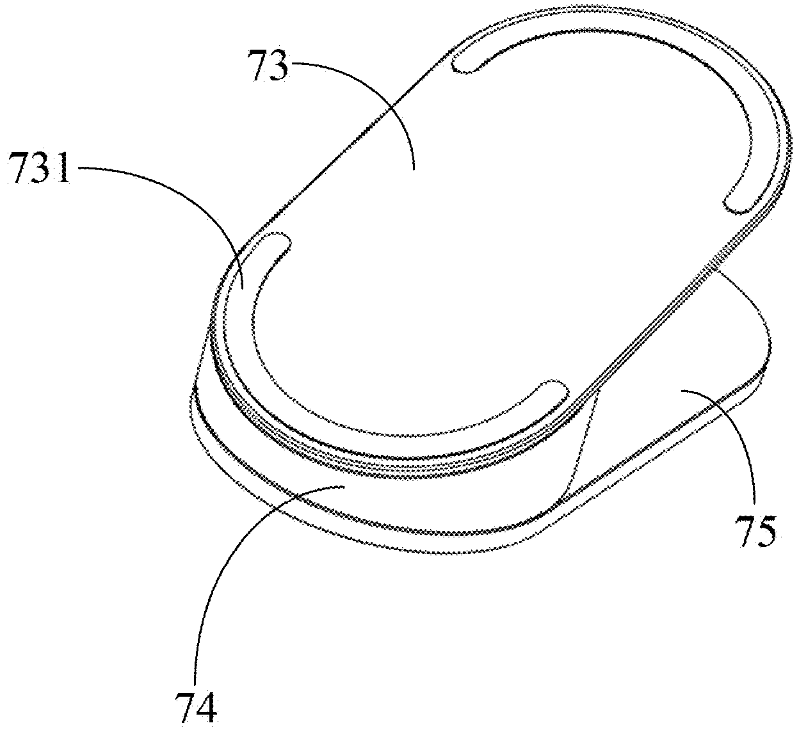
FIG. 9 is a bottom view illustrating the base shown in FIG. 7.

As shown in FIG. 4 and FIG. 5, in some implementations, the checkout device 100 includes a scanning apparatus 4, and the scanning apparatus 4 is fastened to the housing 1 for scanning the product to obtain a price of the product. For example, the price of the product can be obtained by scanning a two-dimensional code of the product. In this application, a scanning method is not limited, provided that the price of the product can be obtained by scanning the product.

In some implementations, the scanning apparatus 4 and the display screen 2 are located on two opposite sides of the housing 1. In FIG. 1, the display screen 2 is located on a front of the checkout device 100, the scanning apparatus 4 is located on a back of the checkout device 100, and the electronic device approaches the NFC module 31 from the front of the checkout device 100, to make an electronic payment.

In some implementations, the checkout device 100 includes a speaker 5 located in the space enclosed by the housing 1. A sound output hole 131 is disposed on the housing 1 for a sound emitted by the speaker 5 to pass through. The speaker 5 can broadcast advertising information, the payment method guidance, the to-be-paid amount, payment completion, etc., can be more convenient to use, and can attract the consumer and improve checkout efficiency.

In some implementations, the sound output hole 131 is disposed on the main body housing 13.

In some implementations, the checkout device 100 includes a main board 61 and a battery 62 located in the space enclosed by the housing 1. The NFC module 31, the circuit board 34, the scanning apparatus 4, the speaker 5, and the battery 62 are coupled to the main board 61.

The housing 1 includes a rear cover plate 15, the rear cover plate 15 is fastened to the main body housing 13, the main board 61 and the battery 62 are located in a space enclosed by the rear cover plate 15 and the main body housing 13, and a through hole 151 is disposed on the rear cover plate 15, to expose the scanning apparatus 4.

In some implementations, the checkout device 100 includes a charging port (not shown in the figure) coupled to the battery 62, to charge the battery 62. In some implementations, the battery 62 can be replaced. In some implementations, the battery 62 may not be disposed, and the checkout device 100 supplies power through an external power supply.

Optionally, the charging port can be of Type, etc.

The checkout device 100 includes a plurality of keys 63, and the keys 63 are disposed on a side edge of the checkout device 100, and can include a power on/off key, a volume adjustment key, etc.

As shown in FIG. 6 to FIG. 9, some implementations of this application provide a checkout assembly, including a base 200 and the above-mentioned checkout device 100. The checkout device 100 is supported on the base 200.

In some implementations, the checkout device 100 can be charged through the base 200.

In some implementations, the base 200 includes a first conductive component 71. As shown in FIG. 4, the checkout device 100 includes a second conductive component 64 fastened to the housing 1 and exposed, and the second conductive component 64 is coupled to the battery 62. When the checkout device 100 is placed on the base 200, the first conductive component 71 is in electrical contact with the second conductive component 64 to charge the battery 62.

In some implementations, the base 200 includes a first magnetic component, and the checkout device 100 includes a second magnetic component located in the housing 1. When the checkout device 100 is placed on the base 200, the first magnetic component and the second magnetic component attract and secure each other magnetically, to improve stability between the checkout device 100 and the base 200, and ensure that the first conductive component 71 is in electrical contact with the second conductive component 64. In addition, alignment between the first conductive component 71 and the second conductive component 64 does not need to be considered, and there is more convenience in use.

In some implementations, the base 200 includes a first support portion 73, a connecting portion 74, and a second support portion 75. The first support portion 73 is configured to be supported on a countertop, the connecting portion 74 connects the first support portion 73 and the second support portion 75, the second support portion 75 is configured to support the checkout device 100, and the second support portion 75 is disposed inclined relative to a vertical direction. When the checkout device 100 is placed on the base 200, the checkout device 100 is in an inclined state, to help a consumer view the display screen 2 and facilitate a contactless payment between an electronic device and the NFC module 31.

In some implementations, the second support portion 75 includes a bottom plate portion 751 and a first retaining edge 752 and a pair of second retaining edges 753 extending from the bottom plate portion 751. When the checkout device 100 is placed on the base 200, the first retaining edge 752 abuts against a bottom end of the checkout device 100, and the pair of second retaining edges 753 are respectively located on two opposite sides of the checkout device 100, to improve stability of the checkout device 100, so as to prevent the checkout device 100 from falling from the base 200. In addition, the pair of second retaining edges 753 can further provide guidance, to direct the checkout device 100 to be assembled on the base 200.

The first retaining edge 752 can be connected to the pair of second retaining edges 753 to form a U shape, or may not be connected.

When the checkout device 100 is not used, the checkout device 100 is placed on the base 200, and can be charged or play an advertisement through the display screen 2. When a payment needs to be collected, the checkout device 100 is removed from the base 200, to manually enter an amount or use the scanning apparatus 4 to scan a product. After the amount is entered or scanning ends, the checkout device 100 is placed on the base 200 again for the consumer to view the payment amount and payment method guidance and bring the electronic device close to the NFC module 31 to make an electronic payment.

Figure 10:
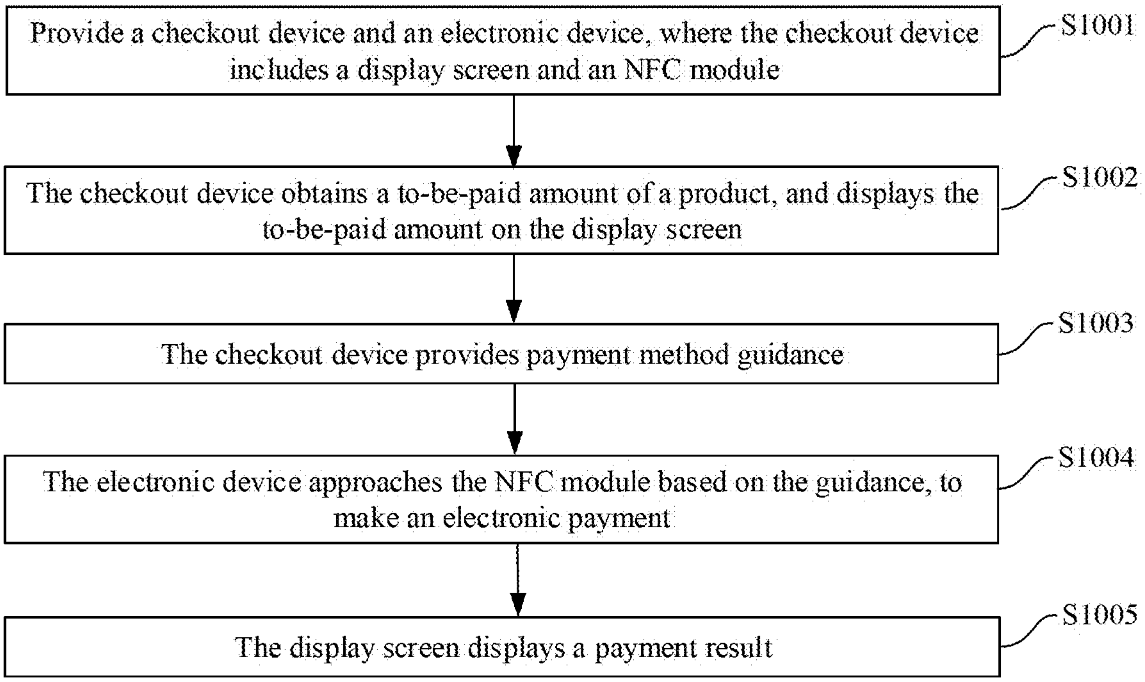
FIG. 10 is a flowchart illustrating an electronic payment method according to some implementations of this application.

As shown in FIG. 10, some implementations of this application provide an electronic payment method, including step S1001 to step S1005.

- S1001: A checkout device 100 and an electronic device are provided, where the checkout device includes a display screen 2 and an NFC module 31.
- S1002: The checkout device 100 obtains a to-be-paid amount of a product, and displays the to-be-paid amount on the display screen 2.
- S1003: The checkout device 100 provides payment method guidance.
- S1004: The electronic device approaches the NFC module 31 based on the guidance, to make an electronic payment.
- S1005: The display screen 2 displays a payment result.

In some implementations, that the checkout device provides payment method guidance includes: The display screen 2 provides visual guidance; and/or a speaker 5 provides voice guidance, where the checkout device includes the speaker 5; and/or an indicator light 32 provides light guidance, where the checkout device includes the indicator light 32.

In some implementations, that the display screen provides visual guidance includes: The picture includes a transition image that displays the to-be-paid amount; and that the display screen 2 displays a payment result includes: After the electronic payment is completed, the display screen displays that the transition image moves toward the electronic device and disappears from the display screen 2.

In some implementations, that the checkout device obtains a to-be-paid amount of a product includes: The to-be-paid amount is manually entered on the display screen 2; and/or a scanning apparatus 4 scans a two-dimensional code of the product to obtain a price of the product, where the checkout device includes the scanning apparatus 4.

A person skilled in the art can easily think of another implementation solution of the present application after considering the specification and practicing the invention disclosed here. This application is intended to cover any variations, uses, or adaptations of this application. These variations, uses, or adaptations follow the general principles of this application and include common knowledge or conventional technical means in the art that are not disclosed in this application. The specification and the implementations are considered as examples, and the true scope and spirit of this application are indicated by the following claims.

It is worthwhile to further note that the terms "include", "comprise", or any other variants thereof are intended to cover a non-exclusive inclusion so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the presence of additional identical elements in the process, method, product, or device that includes the element.

The above-mentioned descriptions are merely example implementations of this application, but are not intended to limit this application. Any modification, equivalent replacement, improvement, etc. made without departing from the spirit and principle of this application should fall within the protection scope of this application.

What is claimed is:

1. A checkout device, comprising:

a housing that encloses a cavity space, the cavity space being at least partially covered by a top cover that protrudes from an upper surface of the housing;

a display screen fastened to the housing; and a Near Field Communication (NFC) module located in the cavity space that is enclosed by the housing.

2. The checkout device of claim 1, wherein the cavity space is located at an end of the housing.

3. The checkout device of claim 1, wherein, when the checkout device is used, the display screen faces a consumer.

4. The checkout device of claim 1, comprising an indicator light comprising a plurality of light emitting diode (LED) beads that form a ring.

5. The checkout device of claim 4, wherein the indicator light is configured to present different light forms in response to the checkout device being in different states.

6. The checkout device of claim 5, wherein the indicator light is configured to flash in response to the checkout device being in a standby state.

7. The checkout device of claim 5, wherein the indicator light is configured to present different colors in response to payment success or payment failure.

8. The checkout device of claim 4, wherein the indicator light is located in the cavity space that is enclosed by the housing.

9. The checkout device of claim 4, wherein the top cover is transmissive to light emitted by the indicator light.

10. The checkout device of claim 9, wherein the top cover is made of transparent material.

11. The checkout device of claim 10, wherein the top cover comprises guiding text.

12. The checkout device of claim 11, wherein the guiding text is transmissive to the light emitted by the indicator light.

13. The checkout device of claim 1, comprising a speaker located in the cavity space that is enclosed by the housing.

14. The checkout device of claim 13, comprising a sound output hole.

15. The checkout device of claim 14, wherein the sound output hole is configured in the housing for a sound emitted by the speaker to pass through.

16. The checkout device of claim 1, comprising a battery located in the housing.

17. The checkout device of claim 16, comprising a charging port coupled to the battery.

18. The checkout device of claim 1, comprising a plurality of keys.

* * * * *